(12) United States Patent
Masubuchi (10) Patent No.: US 8,701,031 B2
(45) Date of Patent: Apr. 15, 2014

(54) CONTENT REPRODUCING APPARATUS, CONTENT REPRODUCING METHOD, SERVER, CONTENT REPRODUCING SYSTEM, CONTENT REPRODUCING PROGRAM, AND STORAGE MEDIUM

(75) Inventor: Minako Masubuchi, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 566 days.

(21) Appl. No.: 12/443,935

(22) PCT Filed: Oct. 11, 2007

(86) PCT No.: PCT/JP2007/069877
§ 371 (c)(1),
(2), (4) Date: Apr. 1, 2009

(87) PCT Pub. No.: WO2008/050613
PCT Pub. Date: May 2, 2008

(65) Prior Publication Data
US 2010/0100837 A1 Apr. 22, 2010

(30) Foreign Application Priority Data
Oct. 25, 2006 (JP) .................................. 2006-290459

(51) Int. Cl.
*G06F 3/00* (2006.01)
(52) U.S. Cl.
USPC ......................................................... 715/771
(58) Field of Classification Search
USPC ......................................................... 715/771
See application file for complete search history.

(56) References Cited

U.S. PATENT DOCUMENTS

| | | | |
|---|---|---|---|
| 6,322,368 B1 * | 11/2001 | Young et al. .................. | 434/236 |
| 6,947,966 B1 * | 9/2005 | Oko et al. ..................... | 709/203 |
| 7,185,283 B1 | 2/2007 | Takahashi | |
| 7,254,605 B1 * | 8/2007 | Strum .......................... | 709/203 |
| 7,296,284 B1 * | 11/2007 | Price et al. ..................... | 725/39 |
| 7,673,317 B1 * | 3/2010 | Shusman ....................... | 725/61 |
| 8,042,050 B2 * | 10/2011 | Cliff et al. .................... | 715/757 |
| 8,332,895 B2 * | 12/2012 | Nathan et al. ................... | 725/61 |
| 2002/0152114 A1 * | 10/2002 | Shumaker et al. .............. | 705/12 |
| 2003/0120495 A1 | 6/2003 | Watanabe et al. | |
| 2003/0227479 A1 * | 12/2003 | Mizrahi et al. ................ | 345/753 |
| 2004/0189717 A1 * | 9/2004 | Conally et al. ................ | 345/853 |

(Continued)

FOREIGN PATENT DOCUMENTS

| | | | |
|---|---|---|---|
| JP | 2000-253337 A | 9/2000 | |
| JP | 2002-290996 A | 10/2002 | |

(Continued)

*Primary Examiner* — Ryan Pitaro
(74) *Attorney, Agent, or Firm* — Birch, Stewart, Kolasch & Birch, LLP (57) ABSTRACT

An input section (15) of a mobile terminal (1) accepts an input of an evaluation of a broadcast program, while the mobile terminal (1) reproduces the broadcast program. A communicating section (13) transmits the evaluation accepted by the input section (15) to a server. The server finds an aggregate total by aggregating, for each broadcast program, evaluations transmitted from a plurality of mobile terminals (1), and transmits the aggregate total to each of the mobile terminals (1). The communicating section (13) receives the aggregate total transmitted from the server. A display section (11) notifies a user of the aggregate total received by the communicating section (13), by displaying the aggregate total on a display (12) while the broadcast program is being reproduced. This increases motivation causing the user to continue to watch and/or listen to content.

11 Claims, 6 Drawing Sheets

(56) References Cited

U.S. PATENT DOCUMENTS

| | | |
|---|---|---|
| 2006/0140580 A1* | 6/2006 | Hiroi et al. .................. 386/52 |
| 2006/0143236 A1* | 6/2006 | Wu ............................ 707/104.1 |
| 2006/0233522 A1* | 10/2006 | Hiroi et al. .................. 386/95 |
| 2006/0294467 A1* | 12/2006 | Auterinen .................... 715/723 |
| 2007/0168867 A1* | 7/2007 | Hiroi et al. .................. 715/723 |
| 2007/0255752 A1* | 11/2007 | Miller ......................... 707/104.1 |
| 2007/0283392 A1 | 12/2007 | Tsusaka et al. |
| 2008/0082394 A1* | 4/2008 | Floyd et al. .................. 705/10 |
| 2008/0104627 A1* | 5/2008 | Avedissian .................... 725/25 |
| 2008/0270915 A1* | 10/2008 | Tevanian et al. ............. 715/751 |
| 2008/0282286 A1* | 11/2008 | Or .............................. 725/34 |
| 2009/0037414 A1* | 2/2009 | Olivier et al. ................. 707/7 |
| 2009/0119335 A1* | 5/2009 | Ide et al. ..................... 707/104.1 |
| 2009/0177607 A1* | 7/2009 | Matsushima ................... 706/46 |
| 2009/0327043 A1* | 12/2009 | Sekhon ......................... 705/10 |
| 2010/0227546 A1* | 9/2010 | Shusman ...................... 455/2.01 |
| 2011/0066943 A1* | 3/2011 | Brillon et al. ................. 715/716 |
| 2011/0138303 A1* | 6/2011 | Ark et al. ..................... 715/753 |

FOREIGN PATENT DOCUMENTS

| | | |
|---|---|---|
| JP | 2003-030105 A | 1/2003 |
| JP | 2003-284008 A | 10/2003 |
| JP | 2004-200733 A | 7/2004 |
| JP | 2005-295266 A | 10/2005 |
| JP | 2006-352438 A | 12/2006 |
| WO | WO-2005/107258 A1 | 11/2005 |

\* cited by examiner

CONTENT REPRODUCING APPARATUS, CONTENT REPRODUCING METHOD, SERVER, CONTENT REPRODUCING SYSTEM, CONTENT REPRODUCING PROGRAM, AND STORAGE MEDIUM

TECHNICAL FIELD

The present invention relates to a content reproducing apparatus, a content reproducing method, a server, a content reproducing system, a content reproducing program, and a storage medium, each for reproducing content such as a broadcast program.

BACKGROUND ART

Audience ratings have been conventionally one of indicators for determining evaluations of television programs. An audience rating is a value (rate) indicating what percentage of residents in a district has watched a television program. An audience rating is measured by a specific specialized company, based on data which can be acquired through specialized devices connected with televisions, which devices are provided in specific monitored households. An audience rating is usually released after the broadcast of a target television program is completed. A high audience rating indicates that many audiences watched the target television program. Therefore, each audience considers based on the audience rating thus released that the target television program was highly evaluated.

SUMMARY OF INVENTION

As described above, an audience rating of a television program is usually released after the broadcast of the television program is completed. Therefore, audiences cannot know during watching a television program how high or low a current audience rating of the television program is. As such, the audiences cannot objectively know, during watching the television program, whether a current evaluation of the television program is high or low. That is, the audience ratings cannot increase motivation causing an audience to continue to watch a television program.

The present invention was made to solve the problem. An object of the present invention is to provide a content reproducing apparatus, a content reproducing method, a server, a content reproducing system, a content reproducing program, and a storage medium, each of which allows an increase in motivation causing a user to continue to watch and/or listen to content.

(Content Display Apparatus)

In order to attain the object, a content display apparatus according to the present invention is a content reproducing apparatus for reproducing content, including: input means for accepting, while the content is being reproduced, an input of an evaluation of content; transmitting means for transmitting the evaluation accepted by the input means to a server which (i) aggregates, for each content, evaluations supplied from a plurality of content reproducing apparatuses so as to find an aggregate total, and (ii) transmits the aggregate total to each of the plurality of content reproducing apparatuses; receiving means for receiving the aggregate total from the server; and notifying means for notifying, while the content is being reproduced, a user of the aggregate total received by the receiving means.

According to the arrangement, the input means accepts an input of an evaluation of content, while the content is reproduced. For example, a user enters an objective value such as +1 and −2.

The evaluation accepted by the input means is transmitted by the transmitting means to the server, which aggregates evaluations. The server aggregates by each content evaluations transmitted from the content reproducing apparatuses, thereby finding an aggregate total. Then, the server transmits the aggregate total thus found to each of the content reproducing apparatuses.

The receiving means of the content reproducing apparatus receives the aggregate total transmitted from the server. Upon receiving the aggregate total, the notifying means of the content reproducing apparatus notifies a user of the aggregate total received by the receiving means, while the content is reproduced. That is, the notifying means notifies in real time the user of the aggregate total of the evaluations of the content being reproduced.

The processes above allow the user to know in real time the aggregate total of the evaluations (hereinafter, the aggregate total of the evaluations is also referred to as aggregate total of evaluations) entered by a plurality of audiences with respect to the content being watched and/or listened by the user. Therefore, the user decides to continue to watch and/or listen to the content by reason that, for example, the aggregate total of evaluations has a high value. Conversely, in a case where the aggregate total of evaluations has a low value, the user can decide to continue to watch and/or listen to the content since the aggregate total of evaluations having the low value induces a user's interest in the content.

As described above, the content reproducing apparatus allows an increase in motivation causing a user to continue to watch and/or listen to content.

(Content Display Method)

In order to attain the object, a content reproducing method according to the present invention is a content reproducing method to be carried out by a content reproducing apparatus for reproducing content, including the steps of: a) accepting, while the content is being reproduced, an input of an evaluation of content; b) transmitting the evaluation accepted in step a) to a server which (i) aggregates, for each content, evaluations supplied from a plurality of content reproducing apparatuses so as to find an aggregate total and (ii) transmits the aggregate total to each of the plurality of content reproducing apparatuses; c) receiving the aggregate total from the server; and d) notifying, while the content is being reproduced, a user of the aggregate total received by the receiving means.

According to the arrangement, the content reproducing method produces the same effect as that of the content reproducing apparatus according to the present invention.

(Reproduction of Moving Image)

The content reproducing apparatus according to the present invention is preferably a content reproducing apparatus wherein: the content is a moving image; the transmitting means correlates (i) the evaluation accepted by the input means with (ii) an elapsed time period between time when the reproduction of the moving image was initiated and time when the evaluation is accepted by the input means, and transmits a correlated result to the server; the receiving means receives an aggregate total for each elapsed time from the server; and the notifying means notifies, in sync with the reproduction of the moving image, the user of the aggregate total for the each elapsed time.

According to the arrangement, the content is a moving image such as a broadcast program. The transmitting means transmits to the server (i) the evaluation thus entered and (ii) the elapsed time period between time when the reproduction of the moving image was initiated and time when the evaluation was entered, so that (i) and (ii) are correlated with each other. Then, the server finds the aggregate total by aggregating, for each elapsed time from time when the reproduction of the moving image was initiated, the evaluations, and transmits the aggregate total to the content reproducing apparatus.

The receiving means of the content reproducing apparatus receives from the server the aggregate total found at the elapsed time. Then, the notifying means notifies, in sync with the reproduction of the moving image, a user of the aggregate total found at the elapsed time of the moving image.

This allows the user to know in real time while watching the moving image the aggregate total of evaluations for a part being reproduced of the moving image. This allows the user to decide more appropriately whether to continue to watch the moving image.

(Graphical Display of Evaluations)

In the content reproducing apparatus according to the present invention, further, it is preferable that the notifying means graphically notifies the user of the aggregate total for the each elapsed time.

The arrangement allows a user to know by viewing a graph an elapsed time of the moving image and the aggregate result of the evaluations, which has been found at the elapsed time. This allows the user to know at a glance which time point a part reproduced of the moving image has been highly evaluated and which time point a part reproduced of the moving image has been evaluated low.

(Reproduction of Content in Case of Evaluations Exceeding Reference Value)

The content reproducing apparatus according to the present invention preferably further includes reproducing means for reproducing only parts of the moving image each of which parts has an aggregate total more than a predetermined reference value.

According to the arrangement, the reproducing means reproduces only a part of the moving image, for which part an aggregate total supplied by the server exceeds a predetermined reference value. For example, the content reproducing apparatus skips reproducing a part of the moving image, for which part an aggregate total is lower than the reference value. Thus, the content reproducing apparatus displays the moving image as if the moving image has been reedited by extracting only parts of the moving image so that aggregate totals of the parts exceed the reference value.

This allows a user to efficiently watch the moving image.

(Aggregation Server)

In order to attain the object, the server according to the present invention includes: receiving means for receiving the evaluations from the plurality of content reproducing apparatuses; aggregating means for aggregating for each content the evaluations received by the receiving means so as to find an aggregate total; and transmitting means for transmitting the aggregate total to each of the content reproducing apparatuses.

The arrangement makes it possible to provide a server that allows an increase in motivation causing a user to continue to watch and/or listen to content being reproduced on the content reproducing apparatus.

(Content Reproducing System)

In order to attain the object, a content reproducing system according to the present invention includes: the content reproducing apparatus; and the server.

The arrangement allows an increase in motivation causing a user to continue to watch and/or listen to content.

(Program and Storage medium)

Note that the content reproducing apparatus can be realized by a computer. In this case, a program that realizes the content reproducing apparatus in a computer by causing the computer to operate as each of the means and a computer-readable storage medium in which the program is stored are also encompassed in the scope of the present invention.

Additional objects, features, and strengths of the present invention will be made clear by the description below. Further, the advantages of the present invention will be evident from the following explanation in reference to the drawings.

BRIEF DESCRIPTION OF DRAWINGS

FIG. 7 (a) of FIG. 7 is a diagram illustrating a television screen displaying a broadcast program. (b) of FIG. 7 is a diagram illustrating a graph of evaluations and a list of broadcast programs, which graph and list are displayed on a display of the mobile terminal while the mobile terminal is within a home network.

EXPLANATION OF REFERENCE NUMERALS

1 Mobile terminal (content reproducing apparatus)
2 Server
3 Recorder
11 Display section (reproducing means, notifying means)
12 Display
13 Communicating section (transmitting means, receiving means)
14 Memory
15 Input section (input means)
16 Key
21 Communicating section (transmitting means, receiving means)
22 Aggregating section
23 Memory
31 Communicating section
32 Video recording section
33 Memory
60 Button
61 Button
100 Content reproducing system

DESCRIPTION OF EMBODIMENTS

The following describes an embodiment of the present invention, with reference to FIGS. 1 through 7.

(Arrangement of Content Reproducing System 100)

Figure 2:
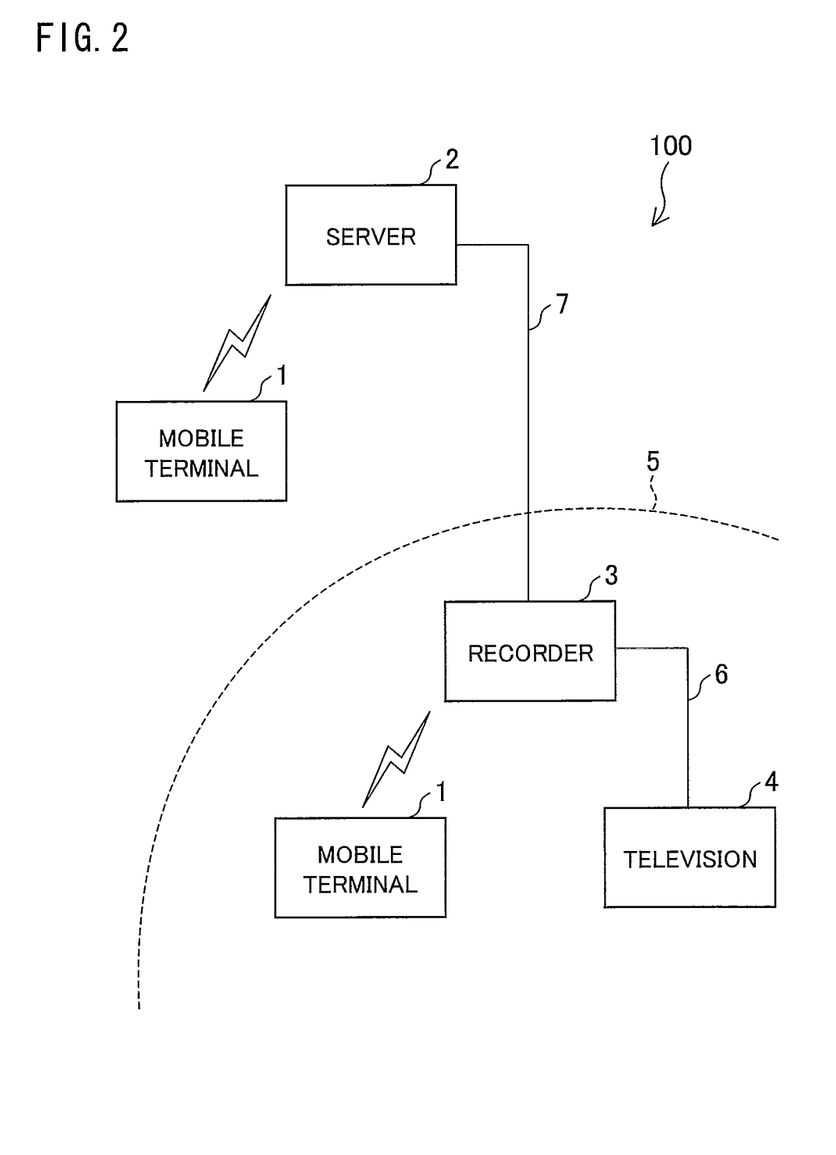
FIG. 2 is a block diagram illustrating an arrangement of a main part of a content reproducing system according to the embodiment of the present invention.

First, the following deals with an arrangement of a content reproducing system 100 according to the present embodiment, with reference to FIG. 2. FIG. 2 is a block diagram illustrating an arrangement of a main part of the content reproducing system 100 of an embodiment in accordance with the present invention. As illustrated in FIG. 2, the content reproducing system 100 includes a mobile terminal 1 (content reproducing apparatus), a server 2, a recorder 3, and a television 4.

In the content reproducing system 100, the recorder 3 and the television 4 are devices that a user of the mobile terminal 1 possesses. Both of the devices are provided so as to be close to each other in a home network 5, and are connected with each other via a domestic wire 6.

On the other hand, the server 2 is provided outside the home network 5. The server 2 is an apparatus that communicates with the recorder 3 via a wide area network wire 7. A user can bring with him the mobile terminal 1 outside the home network 5. The mobile terminal 1 is a device capable of wirelessly communicating with the server 2 and the recorder 3.

The mobile terminal 1 can communicate only with the server 2 while the mobile terminal 1 is outside the home network 5. On the other hand, the mobile terminal 1 can communicate with both of the server 2 and the recorder 3 while the mobile terminal 1 is within the home network 5.

(Arrangement of Mobile Terminal 1)

Figure 1:
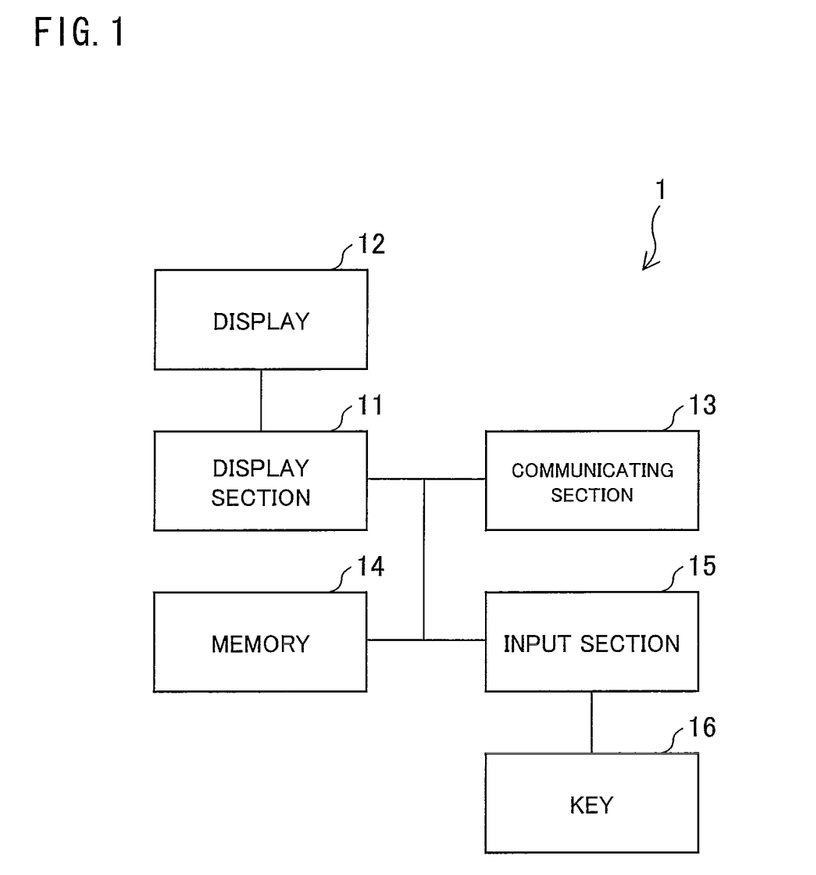
FIG. 1 is a block diagram illustrating an arrangement of a main part of a mobile terminal according to an embodiment of the present invention.

The following describes an arrangement of the mobile terminal 1 according to the present embodiment, with reference to FIG. 1. FIG. 1 is a block diagram illustrating an arrangement of a main part of the mobile terminal 1 according to an embodiment of the present invention. As illustrated in FIG. 1, the mobile terminal 1 includes a display section 11 (reproducing means), a display 12, a communicating section 13 (transmitting means, receiving means), a memory 14, an input section 15 (input means), and a key 16.

(Arrangement of Server 2)

Figure 3:
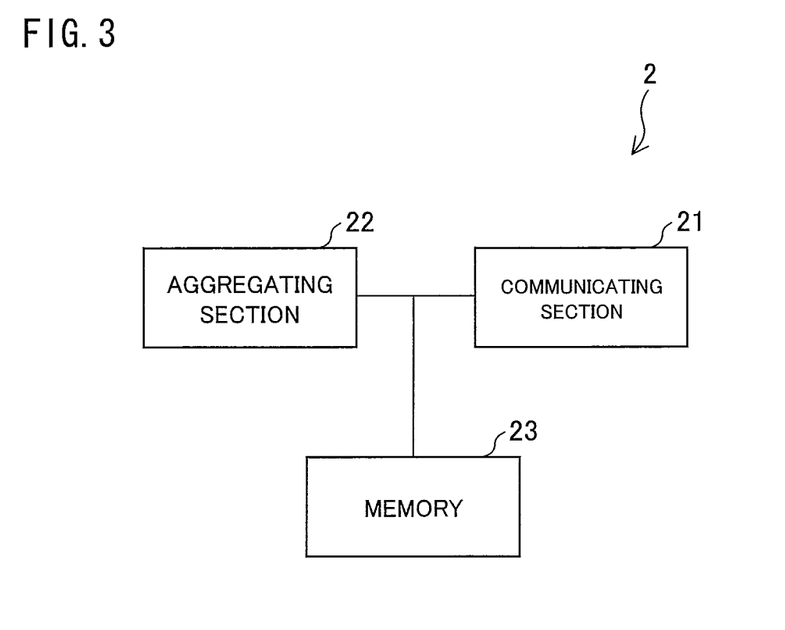
FIG. 3 is a block diagram illustrating an arrangement of a main part of a server according to the embodiment of the present invention.

The following describes an arrangement of the server 2 according to the present embodiment, with reference to FIG. 3. FIG. 3 is a block diagram illustrating an arrangement of a main part of the server 2 according to the embodiment of the present invention. As illustrated in FIG. 3, the server 2 includes a communicating section 21 (transmitting means, receiving means), an aggregating section 22 (aggregating means), and a memory 23.

(Arrangement of Recorder 3)

Figure 4:
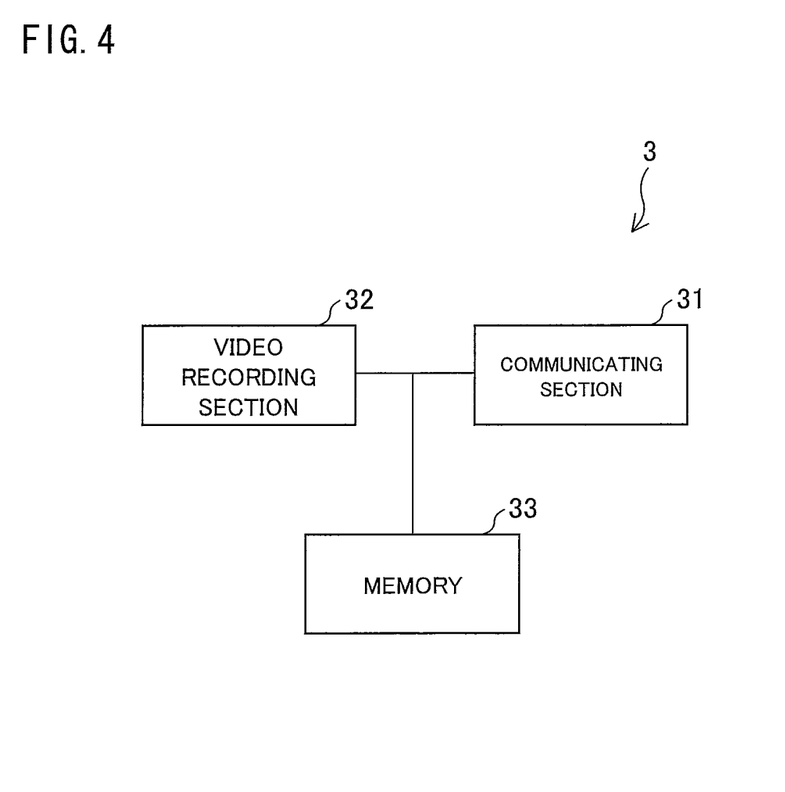
FIG. 4 is a block diagram illustrating an arrangement of a main part of a recorder according to the embodiment of the present invention.

The following describes an arrangement of the recorder 3 according to the present embodiment, with reference to FIG. 4. FIG. 4 is a block diagram illustrating an arrangement of a main part of the recorder 3 according to the embodiment of the present invention. As illustrated in FIG. 4, the recorder 3 includes the communicating section 31, a video recording section 32, and a memory 33.

(Procedure for Aggregating Evaluations)

In the content reproducing system 100, the server 2 aggregates users' evaluations of each broadcast program (content, broadcast program) which the users are watching via respective mobile terminals 1. Specifically, the users operate their mobile terminals 1 so as to enter their evaluations of a broadcast program while watching the broadcast program, respectively. Then, the mobile terminals 1 transmit to the server 2 the evaluations thus entered. Namely, the evaluations entered by the different users via their mobile terminals 1 are transmitted to the server 2. The server 2 aggregates, for each broadcast program or for each elapsed time of the each broadcast program, the evaluations received from the mobile terminals 1. Thus, the server 2 finds an aggregate total of the users' evaluations of each broadcast program.

In the content reproducing system 100, broadcast programs to be reproduced by a mobile terminal 1 are stored in the recorder 3 of the home network 5. That is, the video recording section 31 of the recorder 3 has a function of receiving a broadcast. The video recording section 31 receives a broadcast program which is being broadcasted, via a broadcast antenna (not shown), and records (stores) the broadcast program in the memory 33.

The server 2 consolidates information of broadcast programs which is administered by each of recorders 3. That is, the server 2 (i) communicates with each of the recorders 3, (ii) acquires a list of broadcast programs which each of the recorders 3 can transmit to the server 2, and (iii) stores the list in the memory 23.

(Display of List of Broadcast Programs)

In a case where a user watches a broadcast program via the mobile terminal 1, first, the mobile terminal 1 acquires from the server 2 a list of reproducible broadcast programs as of then. Specifically, the mobile terminal 1 acquires a list of broadcast programs stored in the memory 33 of the recorder 3.

Specifically, the communicating section 13 of the mobile terminal 1 transmits to the server 2 a request to acquire a list of broadcast programs. The communicating section 21 of the server 2 receives the request. This causes the communicating section 21 reads out the list of broadcast programs stored in the memory 23, and transmits the list of broadcast programs to the mobile terminal 1. Concurrently, the communicating section 21 transmits to the mobile terminal 1 information on evaluation rankings determined based on the total of the respective aggregate evaluations of the broadcast programs.

Note that the communicating section 21 can selectively transmit to the mobile terminal 1 only a list of reproducible broadcast programs among lists of broadcast programs stored in the memory 23.

(Display of Ranking Information)

The communicating section 13 of the mobile terminal 1 receives from the server 2 (i) the list of broadcast programs and (ii) the evaluation rankings of the broadcast programs, which (i) and (ii) are supplied to the display section 11. The display section 11 displays, from the top of a screen, the broadcast programs listed on the list of broadcast programs in descending order of the evaluation rankings, in accordance with the information thus supplied. That is, ranking information of the broadcast programs is displayed on the display 12, in the form of an example illustrated in FIG. 5.

Figure 5:
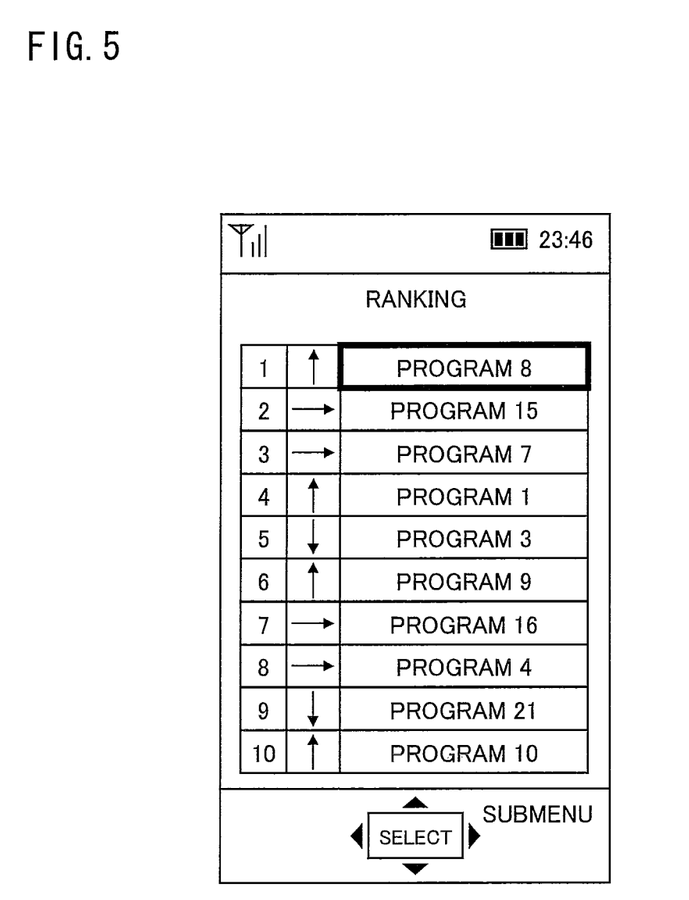
FIG. 5 is a diagram illustrating ranking information of broadcast programs, which is displayed by the mobile terminal.

FIG. 5 illustrates the ranking information of the broadcast programs which is displayed by the mobile terminal 1. As illustrated in FIG. 5, the mobile terminal 1 displays, from the top of the screen, the rankings and the names of the broadcast programs in descending order of evaluations. For example, a first place and a second place are taken by a broadcast program 8 and a broadcast program 15, respectively. When the user views the ranking information illustrated in FIG. 5, the user can know at a glance which broadcast program is highly evaluated as of then.

Characteristics for the evaluation are set, as evaluation criteria suitable for each broadcast program, by a provider of broadcast programs and/or services. For example, the characteristics of evaluations can be freely set, provided that the evaluations are evaluations of a broadcast program, such as "interesting", "fun", "scary", or "lovable", which evaluations allow value judgments of some sort to be made on the broadcast program.

The server 2 transmits a same list of broadcast programs to each of the mobile terminals 1. As such, each of the mobile terminals 1 displays the ranking information illustrated in FIG. 5. Note in FIG. 5 that the first through tenth places are displayed. However, the present embodiment is not limited to this. For example, an eleventh place and subsequent places can be further displayed.

(Procedure for Reproducing Broadcast Program)

A user selects a desired broadcast program while the screen illustrated in FIG. 5. is displayed. For example, a user enters a numeral "1" by pushing the key 16 of the mobile terminal 1 in a case where the user intends to watch the broadcast program 8 ranked in the first place.

Assume here that the user has selected the broadcast program 8. This causes the mobile terminal 1 to acquire, via the server 2, the broadcast program 8 administered by a recorder 3, and then reproduces the broadcast program 8. Specifically, the communicating section 13 of the mobile terminal 1 transmits a request to acquire the broadcast program 8 to the server 2. Concurrently, the communicating section 13 transmits identifying information for uniquely identifying the mobile terminal 1 so that a recorder 3 which supplies the broadcast program 8 is specified. The identifying information is, for example, a telephone number assigned to the mobile terminal 1.

The communicating section 21 of the server 2 receives from the mobile terminal 1 the acquisition information on the broadcast program 8 and the telephone number of the mobile terminal 1. The memory 23 of the server 2 stores in advance an administrative table in which telephone numbers and pieces of information for specifying recorders 3 are stored so as to be correlated with each other, respectively. The communicating section 21 refers to the administrative table stored in the memory 23, and specifies a recorder 3 corresponding to the telephone number thus received. That is, the communicating section 21 specifies a recorder 3 that the user of the mobile terminal 1 possesses. The communicating section 21 selects, as a party to communicate, the recorder 3 thus specified, and then transmits to the recorder 3 the request to acquire the broadcast program 8.

The communicating section 31 of the recorder 3 receives from the server 2 the request to acquire the broadcast program 8. The communicating section 31 reads out from the memory 33 the broadcast program 8 thus requested, and then transmits the broadcast program 8 to the server 2. The communicating section 21 of the server 2 receives the broadcast program 8 thus transmitted, converts the format of the broadcast program 8 into a format which the mobile terminal 1 can reproduce, and then transmits the broadcast program 8 thus converted to the mobile terminal 1.

The communicating section 13 of the mobile terminal 1 receives the broadcast program 8 from the server 2, and then supplies the broadcast program 8 to the display section 11. The display section 11 displays on the display 12 the broadcast program 8 thus supplied. As a result, the user can watch, via the display 12, the broadcast program 8 which the user specified as the one to be reproduced. Note that the mobile terminal 1 selectively reproduces the broadcast program 8, which is administered by the recorder 3 of the user of the mobile terminal 1, by use of the identifying information of the mobile terminal 1. That is, the mobile terminal 1 cannot reproduce another program 8 which is administered by another user's recorder 3.

(Example of Display Screen)

Figure 6:
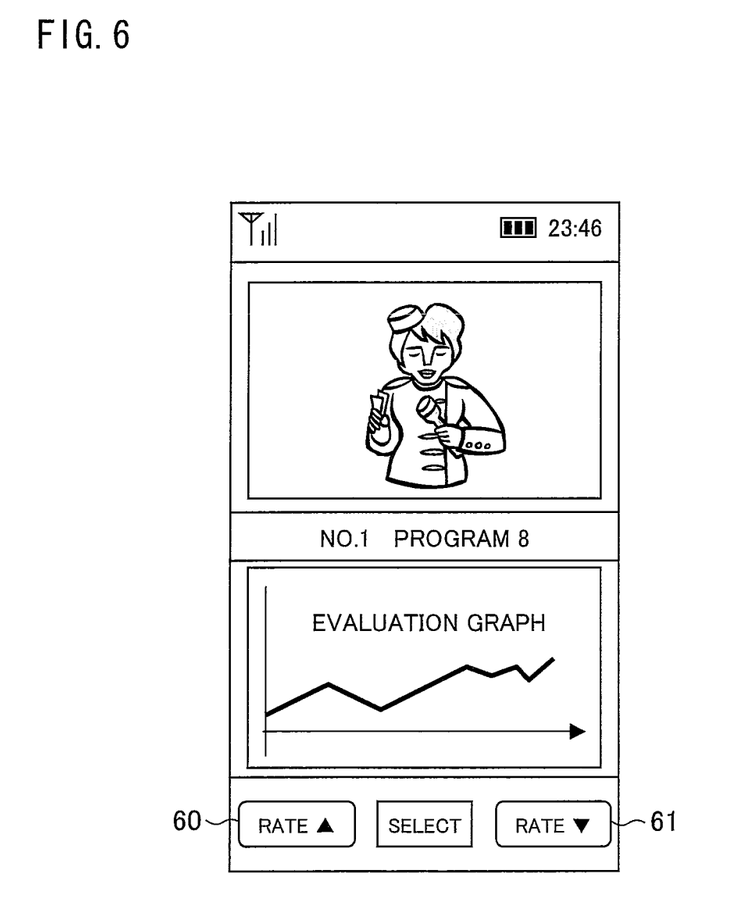
FIG. 6 is a diagram illustrating a broadcast program and a graph of evaluations of the broadcast program, which broadcast program and graph are displayed by the mobile terminal 1.

The following describes an example of a display screen to be displayed while the mobile terminal 1 reproduces a broadcast program, with reference to FIG. 6. FIG. 6 shows that the mobile terminal 1 displays a broadcast program and a graph of evaluations of the broadcast program. As illustrated in FIG. 6, the display section 11 of the mobile terminal 1 displays on the display 12 the broadcast program 8 received from the server 2. Concurrently, the display section 11 displays the evaluation graph of the broadcast program 8. The evaluation graph is described later. The display section 11 further displays on the display 12 a button 60 and a button 61, via which an evaluation of the broadcast program 8 which is being reproduced is entered.

(Entry and Aggregation of Evaluations)

A user operates the key 16 to push the button 60 or the button 61 while a broadcast program is reproduced. Thus, the user enters an evaluation of the broadcast program which is being reproduced. For example, while the user pushes the button 60, the pushing operation is accepted by the input section 15. This causes the input section 15 to determine that the user has positively evaluated the broadcast program, and finds a positive evaluation which is in proportion to the number of times the button 60 is pushed.

In a case where the user pushes the button 61, the pushing operation is similarly accepted by the input section 15. This causes the input section 15 to determine that the user has negatively evaluated the broadcast program, and finds a negative evaluation which is in proportion to the number of times the button 61 is pushed.

The input section 15 supplies the evaluation thus found to the communicating section 13. The communicating section 13 correlates (i) the evaluation thus supplied with (ii) program identifying information for identifying a broadcast program which is being reproduced and (iii) an elapsed time period between time when the reproduction of the broadcast program which is being reproduced was initiated and time when the evaluation was entered, and transmits a correlated result to the server 2.

The communicating section 21 of the server 2 receives the information (i) through (iii) from the mobile terminal 1. The communicating section 21 supplies the information (i) through (iii) thus received to the aggregating section 22. First, the aggregating section 22 reads out from the memory 23 an aggregate total of evaluation found at the elapsed time thus supplied with respect to the broadcast program indicated by the program identifying information thus supplied. Then, the aggregating section 22 adds the evaluation supplied from the communicating section 21 to the aggregate total read out from the memory 14, thereby finding a new aggregate total. The aggregating section 22 overwrites the memory 14 so that the old aggregate total is replaced with the new aggregate total. Therefore, the aggregate total is increased in a case where the evaluation entered by the user is positive, whereas the aggregate total is decreased in a case where the evaluation entered by the user is negative.

By carrying out the processes above, the server 2 (i) aggregates, for each broadcast program and each elapsed time, evaluations transmitted from the respective mobile terminals 1, each of which evaluations is entered for each broadcast program and at each elapsed time, and (ii) stores in the memory 23 the aggregate totals thus found. Further, the server 2 supplies the aggregate total of evaluations thus found to each of the mobile terminals 1 which are reproducing the broadcast program. According to the example illustrated in FIG. 6, the server 2 (i) reads out, for each elapsed time of the broadcast program 8, from the memory 23 an aggregate total found at the each elapsed time and (ii) transmits the aggregate total to the mobile terminal 1, while the mobile terminal 1 is reproducing the broadcast program 8.

The mobile terminal 1 receives from the server 2 the aggregate total of evaluations found for a part of the broadcast program 8 which is currently being reproduced, and notifies the user of the aggregate total of evaluations, while the broadcast program 8 is being reproduced. Specifically, as illustrated in FIG. 6, the display section 11 graphically displays on the display 12 the aggregate total of evaluations which varies with elapsed time, and which is received by the communicating section 13. Thus, while the mobile terminal 1 is reproducing the broadcast program 8, the mobile terminal 1 notifies its user of the aggregate total of evaluations of a plurality of users with respect to a part of the broadcast program 8 which is being currently reproduced.

(Functions and Effects)

The processes above allow a user to know in real time the aggregate total of evaluations entered by a plurality of users with respect to a broadcast program which is being watched by the user. Therefore, the user can decide to continue to watch the broadcast program based on the fact that, for example, the aggregate total of evaluations is large. Conversely, in a case where the aggregate total of evaluations is small, the user can decide to continue to watch the broadcast program since such a small aggregate total of evaluations induces a user's interest in the broadcast program.

As described above, the mobile terminal 1 allows an increase in motivation causing a user to continue to watch a broadcast program.

A user watching the broadcast program 8 via the screen illustrated in FIG. 6 can graphically check not only the aggregate total of evaluations found for a part of the broadcast program 8 which is currently being reproduced, but also how the aggregate total of evaluations of the broadcast program 8 had changed with elapsed time after the reproduction of the content was completed. This allows the user to know at a glance which reproduced part of the broadcast program 8 was highly evaluated (i.e., was highly supported from the audiences) and which reproduced part of the broadcast program 8 was evaluated low (i.e., was supported low from the audiences). In a case where the user has watched the whole broadcast program 8, the user can know how the evaluations change with elapse time from the beginning to the end of the broadcast program 8.

(Example in Which Broadcast Program is Displayed by Television)

The mobile terminal 1 can directly communicate with the recorder 3 while the mobile terminal is within the home network 5. Assume that, a user selects on the screen illustrated in FIG. 5 a reproduction of the broadcast program 8, in a case where the mobile terminal 1 is within an area in which the mobile terminal 1 can directly communicate with the recorder 3. In this case, the mobile terminal 1 directly communicates with the recorder 3 so as to instruct the recorder 3 to reproduce the broadcast program 8, instead of acquiring the broadcast program 8. The recorder 3 causes a television 5, connected with the recorder 3 via the domestic wire 6, to display the broadcast program 8. A displayed example is illustrated in (a) of FIG. 7. (a) of FIG. 7 is a diagram illustrating a screen on which the television 4 displays the broadcast program 8.

Further, the recorder 3 notifies the mobile terminal 1 that the recorder 3 has caused the television 5 to display the broadcast program 8. Upon receiving the notification, the mobile terminal 1 can recognize that the user can watch the broadcast program 8 on the television 4 near the user. Therefore, the mobile terminal 1 determines that the mobile terminal 1 is not required to acquire the broadcast program 8 via the server 2 so as to reproduce the broadcast program 8. Accordingly, the mobile terminal 1 does not transmit to the server 2 a request to acquire the broadcast program 8.

Note, however, that the aggregate totals of evaluations of the broadcast program 8 are administered by the server 2, not by the recorder 3. As such, the mobile terminal 1 requests the server 2 to transmit to the mobile terminal 1 the aggregate total of evaluations of the broadcast program 8. In response to the request, the server 2 transmits to the mobile terminal 1 the aggregate total of evaluations of the broadcast program 8. As illustrated in (b) of FIG. 7, the mobile terminal 1 graphically displays the aggregate total of evaluations of the broadcast program 8, received from the server 2, which aggregate total varies with elapsed time. (b) of FIG. 7 illustrates an evaluation graph and a list of broadcast programs, both of which are displayed on the display 12 by the mobile terminal 1 in a case where the mobile terminal 1 is within the home network 5.

Figure 7:
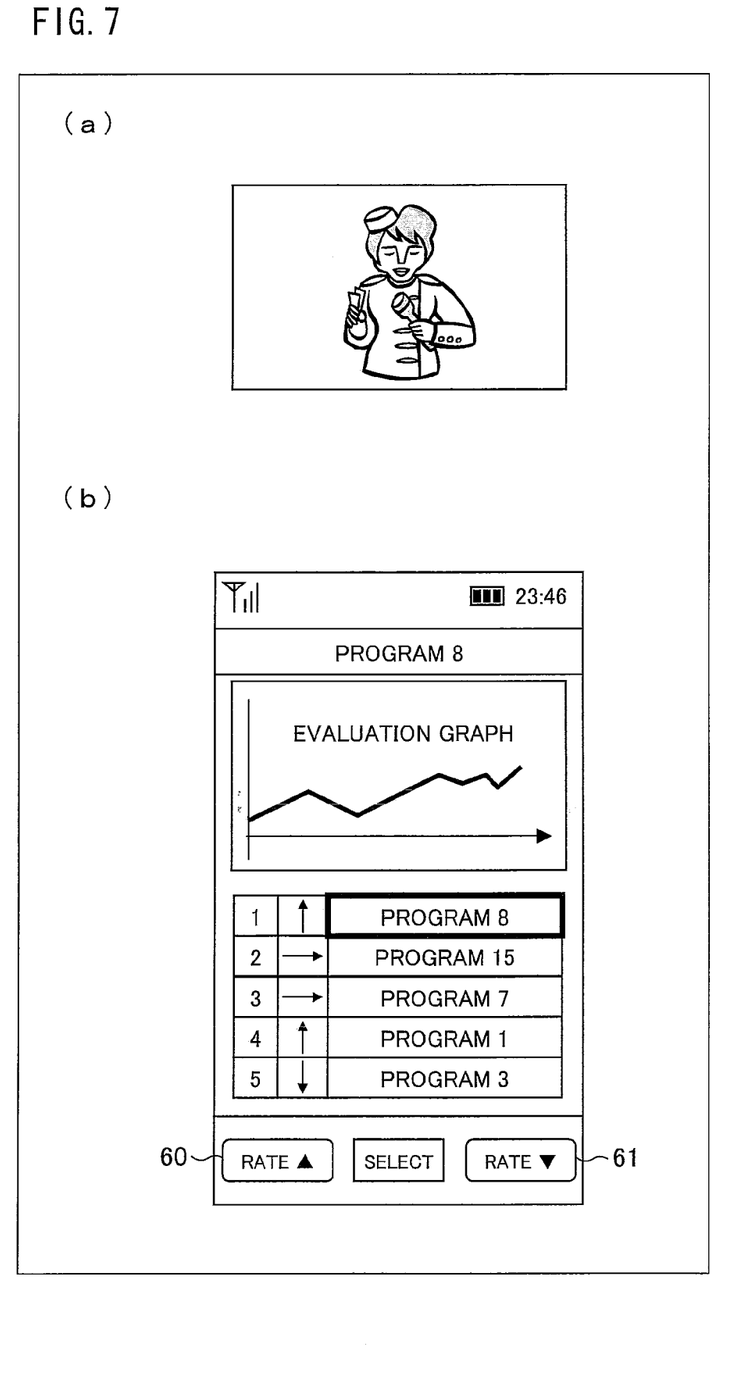

According to an example illustrated in (b) of FIG. 7, the mobile terminal 1 concurrently displays the evaluation graph and the list of broadcast programs, which list shows top five programs in view of the evaluation. This allows the mobile terminal 1 to make best use of the display screen of the display 12, which display screen is smaller in area than that of the television 4. According to the arrangement, a user can accessorily use the mobile terminal 1 as a remote control of the recorder 3.

Thus, a user operates the mobile terminal 1 to enter an evaluation of the broadcast program 8 which is being displayed on the television 4. The same applies to a case where the mobile terminal 1 is outside the home network 5 and displays the screen illustrated in FIG. 6. That is, the mobile terminal 1 concurrently displays the button 60 and the button 61, which are provided for entering an evaluation of a broadcast program, while displaying the screen illustrated in FIG. 7. In this case, the mobile terminal 1 transmits an entered evaluation to the server 2, not to the recorder 3. The same applies to the case where the mobile terminal 1 is outside the home network 6 and displays the screen illustrated in FIG. 6.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

(Various Modifications)

For example, content to be reproduced by the mobile terminal 1 is not limited to a broadcast program (moving image), provided that the content is data which can be electrically reproduced and which can be watched and/or listened by a user. For example, the content can be music content.

It is not limited to the recorder 3 that broadcast programs should be stored. The broadcast programs can be stored in the mobile terminal 1 in advance. Alternatively, the broadcast programs can be stored in a different server connected with the server 2. It is possible to take a so-called Web TV as the latter example.

Further, a broadcast program to be reproduced by the mobile terminal 1 can be a recorded broadcast program or a live broadcast program. Therefore, upon receiving evaluations of a broadcast program from the mobile terminal 1, the evaluations are reflected by the server 2 in a consolidated aggregate total of evaluations of the broadcast program, without distinguishing whether the broadcast program is a recorded broadcast program or a live broadcast program.

Further, the server 2 can aggregate evaluations of a broadcast program by sex and/or age of users.

In the reproduction of a broadcast program, the mobile terminal 1 preferably reproduces only parts of the broadcast program each of which parts has an aggregate total of evaluations more than a predetermined reference value. The reference value is stored in the memory 14 in advance. The reference value is set by a user, for example. The display section 11 compares an aggregate total of evaluations transmitted from the server 2 with the reference value stored in the memory 14, while a broadcast program is displayed. As a result, a reproduction is skipped with respect to a part of the broadcast program which is being reproduced, which part has an aggregate total of evaluations smaller than the reference value. This causes the mobile terminal 1 to selectively display on the display 12 only the parts each of which has an aggregate total of evaluations more than the reference value.

The processes allow a user to watch only parts evaluated higher than a certain level. This makes it possible for a user to efficiently watch a broadcast program.

There can be some broadcast programs, which are not actually recorded by the recorder 3, among broadcast programs listed on a list of broadcast programs, which list is displayed by the mobile terminal 1. This is because the server consolidates broadcast programs recorded by a plurality of recorders 3, and distributes a list of the broadcast programs to the plurality of mobile terminals 1.

In view of the circumstances, the mobile terminal 1 can display a list of broadcast programs such that a user cannot select a broadcast program which cannot be acquired from the recorder 3 via the server 2. Specifically, the mobile terminal 1 carries out a hatched display or a halftone display with respect to the information of a broadcast program which cannot be selected by the user.

Instead, it can be arranged such that the mobile terminal 1 accepts a selection of a broadcast program which is not recorded by the recorder 3. In this case, the mobile terminal 1 instructs the recorder 3 to program the recorder 3 itself to record a repeat of the broadcast program. Alternatively, the mobile terminal 1 can access another server commercially providing the broadcast program so as to acquire and reproduce the broadcast program. Alternatively, the mobile terminal 1 can receive a broadcast wave to reproduce a broadcast program, in a case where the broadcast program is a live one. Alternatively, the mobile terminal 1 can instruct the recorder 3 to program the recorder 3 itself to record the broadcast program.

The mobile terminal 1 can display a list of broadcast programs not in descending order of evaluations as illustrated in FIG. 5, but in ascending order of evaluations. In either case, the mobile terminal 1 gives its user an incentive to watch a broadcast program because of the evaluations of the broadcast program which function as indexes.

(Content Reproducing Program and Storage Medium)

Finally, the blocks of the mobile terminal 1 can be realized by way of hardware. Alternatively, the blocks can be realized by way of software which is executed by a CPU (Central Processing Unit) as follows.

Specifically, the mobile terminal 1 includes a CPU (Central Processing Unit) and memory devices (memory media). The CPU (Central Processing Unit) executes instructions in control programs for causing the functions to be realized. The memory devices include a ROM (Read Only Memory) which stores programs, a RAM (Random Access Memory) to which the programs are loaded, and a memory storing the programs and various data.

The object of the present invention can also be achieved by a predetermined storage medium, provided that the mobile terminal 1 is arranged like above. Such a storage medium should store program code (executable program, intermediate code program, or source program) of control program for the mobile terminal 1, which control program is software for realizing the aforementioned functions, so that a computer can retrieve and execute the control program code stored in the storage medium. The storage medium is provided to the mobile terminal 1. Then, the mobile terminal 1, which functions as the computer (or CPU, MPU), can retrieve and execute the program code stored in the storage medium.

The storage medium for providing the mobile terminal 1 with the program code is not limited to a storage medium having a specific structure or a specific type. Specifically, the storage medium can be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The object of the present invention can be also achieved by an arrangement in which the mobile terminal 1 is connectable to a communications network. In this case, the program is delivered to the mobile terminal 1 over the communications network. The communications network is not limited to a specific type or form, provided that the program code can be supplied to the mobile terminal 1. The communications network can be, for example, the Internet, an intranet, extranet, LAN, ISDN, VAN, CATV communications network, virtual dedicated network (virtual private network), telephone line network, mobile communications network, or satellite communications network.

The transfer medium which makes up the communications network is not limited to a specific arrangement or a type, but can be any medium that can transmit the program code. The transfer medium may be, for example, wired line, such as IEEE 1394, USB (Universal Serial Bus), electric power line, cable TV line, telephone line, or ADSL (Asymmetric Digital Subscriber Line); or wireless, such as infrared radiation (IrDA, remote control), Bluetooth®, 802.11 wireless, HDR, mobile telephone network, satellite line, or terrestrial digital network. The present invention encompasses computer data signals embedded in a carrier wave, which computer data signals are the program code embodied through electronic transmission.

As described above, the content reproducing apparatus according to the present invention includes: input means for accepting, while the content is being reproduced, an input of an evaluation of content; transmitting means for transmitting the evaluation accepted by the input means to a server which (i) aggregates, for each content, evaluations supplied from a plurality of content reproducing apparatuses so as to find an aggregate total, and (ii) transmits the aggregate total to each of the plurality of content reproducing apparatuses; receiving means for receiving the aggregate total from the server; and notifying means for notifying, while the content is being reproduced, a user of the aggregate total received by the receiving means.

This makes it possible to increase in motivation causing a user to continue to watch and/or listen to content.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be widely used as a reproducing apparatus for reproducing content, such as a mobile terminal device which displays a broadcast program.

The invention claimed is:

1. A content reproducing apparatus for reproducing content, comprising:
a processing unit;
an input section for accepting, during a reproduction period in which the content is being reproduced, an input of an evaluation of content;
a transmitting section for transmitting the evaluation to a server which aggregates, for each content, evaluations supplied from a plurality of content reproducing apparatuses so as to find a first aggregate amount corresponding to a first time in the reproduction period, and which transmits the first aggregate amount to the plurality of content reproducing apparatuses;
a receiving section for receiving the first aggregate amount corresponding to the first time from the server;
a notifying section for simultaneously notifying, while the content is being reproduced, a user of the first aggregate amount corresponding to the first time and of a second aggregate amount corresponding to a second time in the reproduction period;
a reproducing section configured to reproduce only parts of the moving image having an aggregate amount more than a predetermined reference value; and
a display output device configured to present a list of broadcast programs sorted according to the evaluation of each of the broadcast programs, wherein
the input section finds the evaluation of the content in accordance with the number of times the user pushes a button,
the input section is further configured to receive input selecting one of the broadcast programs for reproduction, and
the list of broadcast programs includes an indicator representing a trend of the evaluation in each of the broadcast programs.

2. The content reproducing apparatus as set forth in claim 1, wherein:
the content is a moving image;
the transmitting section correlates the evaluation with an elapsed time period between a time when the reproduction of the moving image was initiated and a time when the evaluation is accepted by the input section, and transmits a correlated result to the server;
the receiving section receives an aggregate amount for each elapsed time from the server; and
the notifying section notifies, in sync with the reproduction of the moving image, the user of the aggregate amount for the each elapsed time.

3. The content reproducing apparatus as set forth in claim 2, wherein the notifying section graphically notifies the user of the aggregate amount for the each elapsed time.

4. The content reproducing apparatus as set forth in claim 1, wherein the content is a television program.

5. The content reproducing apparatus as set forth in claim 1, wherein the input section accepts a positive evaluation of the content and a negative evaluation of the content.

6. The content reproducing apparatus as set forth in claim 1, wherein:
the server aggregates the evaluations for the each content by sex and/or age of users.

7. The content reproducing apparatus as set forth in claim 1, wherein
the broadcast program selected for reproduction by the input section is reproduced on a television, and
the display output device of the content reproducing apparatus displays an evaluation graph of the selected broadcast program being reproduced on the television.

8. A server comprising:
a processing unit;
a receiving section for receiving the evaluations from the plurality of content reproducing apparatuses recited in claim 1;
an aggregating section for aggregating for each content the evaluations so as to find an aggregate amount; and
a transmitting section for transmitting the aggregate amount to the content reproducing apparatuses.

9. A content reproducing system comprising:
a content reproducing apparatus as recited in claim 1;
a server comprising a processing unit and a receiving section for receiving the evaluations from a plurality of content reproducing apparatuses;
an aggregating section for aggregating for each content the evaluations so as to find an aggregate amount; and
a transmitting section for transmitting the aggregate amount to the content reproducing apparatuses.

10. A non-transitory tangible computer-readable medium storing a content reproducing program that, when executed, causes one or more processors to at least:
accept, during a reproduction period in which content is being reproduced, an input of an evaluation of content;
transmit the evaluation to a server which aggregates, for each content, evaluations supplied from a plurality of content reproducing apparatuses so as to find a first aggregate amount corresponding to a first time in the reproduction period and which transmits the first aggregate amount to the plurality of content reproducing apparatuses;
receive the first aggregate amount from the server;
notify, while the content is being reproduced, a user of the first aggregate amount corresponding to the first time and of a second aggregate amount corresponding to a second time in the reproduction period; and
control reproducing of content to reproduce only parts of the moving image having an aggregate amount more than a predetermined reference value, wherein
the evaluation of the content is found in accordance with the number of times the user pushes a button,
the content reproducing program further causes the one or more processors to:
control a display output device to present a list of broadcast programs sorted according to the evaluation of each of the broadcast programs;
control an input section to receive input selecting one of the broadcast programs for reproduction; and
include an indicator representing a trend of the evaluation in each of the broadcast programs.

11. The tangible computer-readable medium according to claim 10, wherein the content reproducing program further causes the one or more processors to:
reproduce the broadcast program selected for reproduction by the input section on a television; and
control the display output device to display an evaluation graph of the selected broadcast program being reproduced on the television.

* * * * *